United States Patent [19]

Kosonen

[11] 4,105,563  
[45] Aug. 8, 1978

[54] CONTINUOUS DRUM FILTER WITH IMPROVED AGITATOR STRUCTURE

[75] Inventor: Vaino J. Kosonen, West Redding, Conn.

[73] Assignee: Dorr-Oliver Incorporated, Stamford, Conn.

[21] Appl. No.: 788,265

[22] Filed: Jun. 6, 1977

[51] Int. Cl.² ............................................. B01D 33/34  
[52] U.S. Cl. ................................... 210/383; 210/402  
[58] Field of Search .............................. 210/402–404, 210/407, 413, 383; 259/100, 101, DIG. 16

[56] References Cited

U.S. PATENT DOCUMENTS

| | | | |
|---|---|---|---|
| 2,988,224 | 6/1961 | Green | 210/383 |
| 3,466,016 | 9/1969 | Jablon | 259/20 X |
| 3,726,510 | 4/1973 | Davis et al. | 210/402 X |
| 3,919,088 | 11/1975 | Doncer et al. | 210/402 |

Primary Examiner—William A. Cuchlinski, Jr.  
Attorney, Agent, or Firm—Burtsell J. Kearns; Harold M. Snyder

[57] ABSTRACT

A continuous rotary vacuum drum filter with improved suspension means for an oscillatable agitator frame structure operating in the filter vat to keep pulp solids in suspension, featuring a non-rigid stress compensating suspension connection between the agitator frame structure and the supporting torsion bearings comprising a hinge linkage connection between a torsion bearing housing and the respective end of the agitator structure arranged whereby the hinge axis extends at right angles to the oscillatory axis of the agitator structure. A removable hinge pin is provided to permit disconnection of the torsion bearings from the agitator structure and actuating means are pivotally connected to the hinge linkage for oscillating the agitator structure.

21 Claims, 24 Drawing Figures

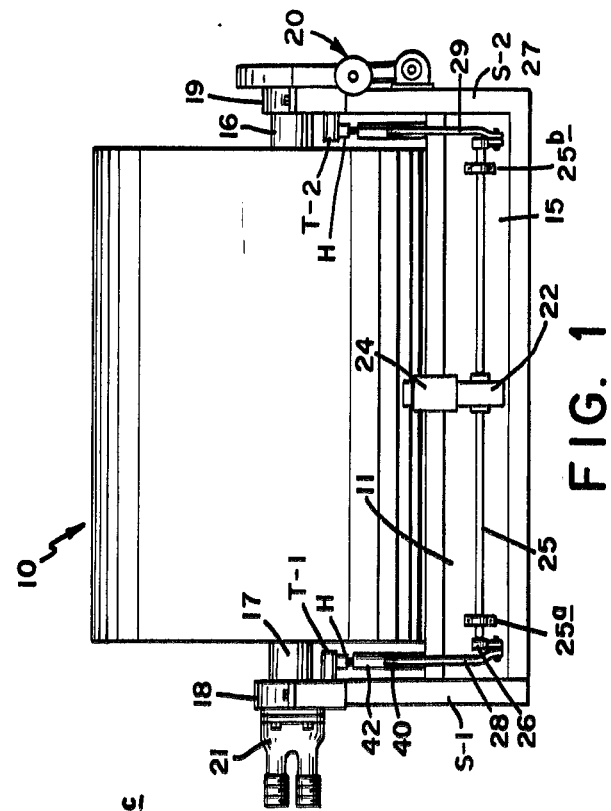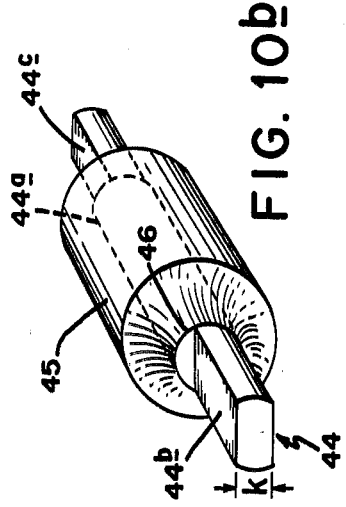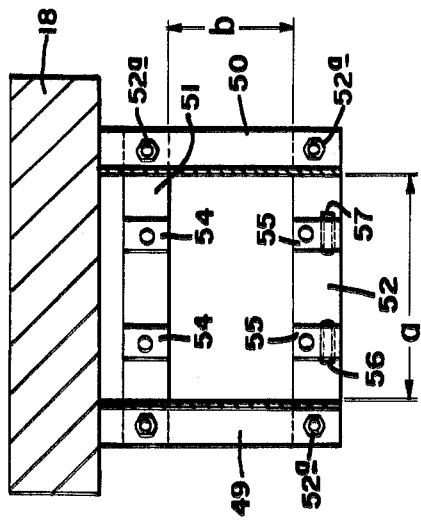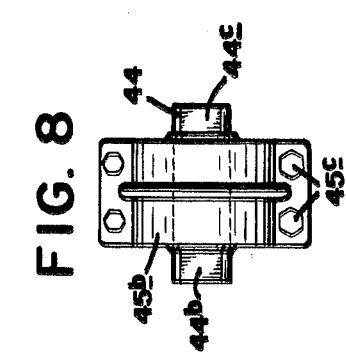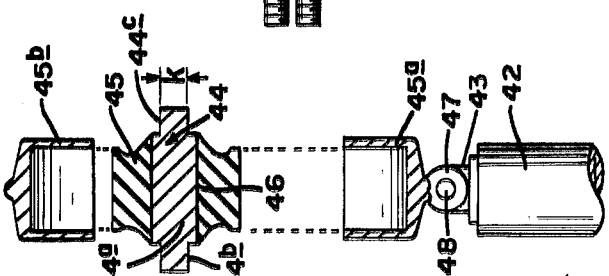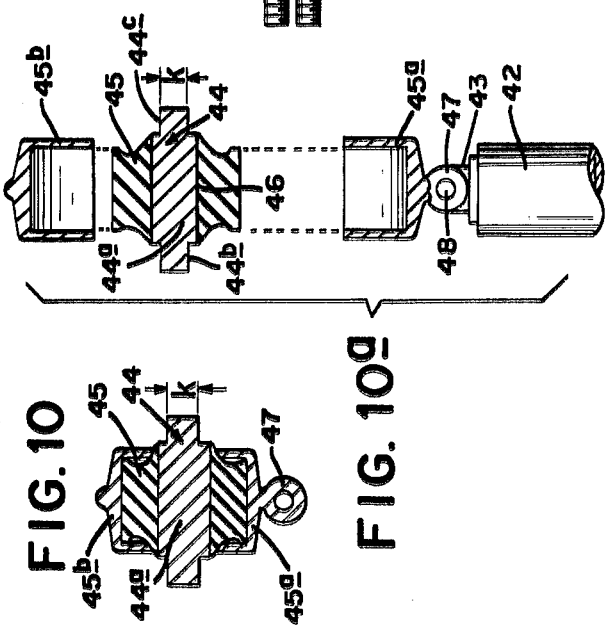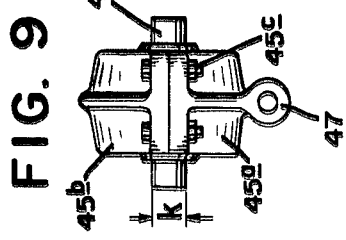

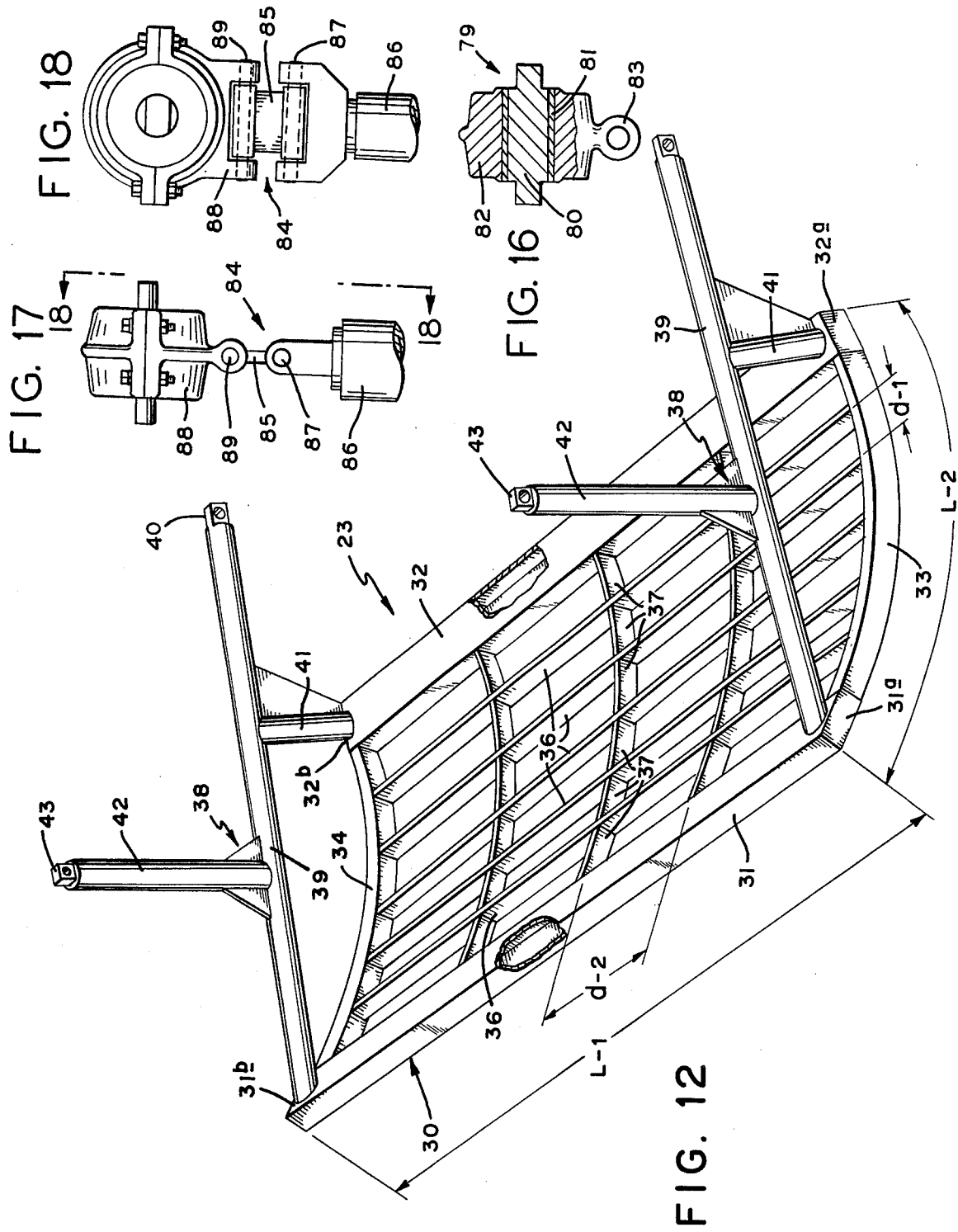

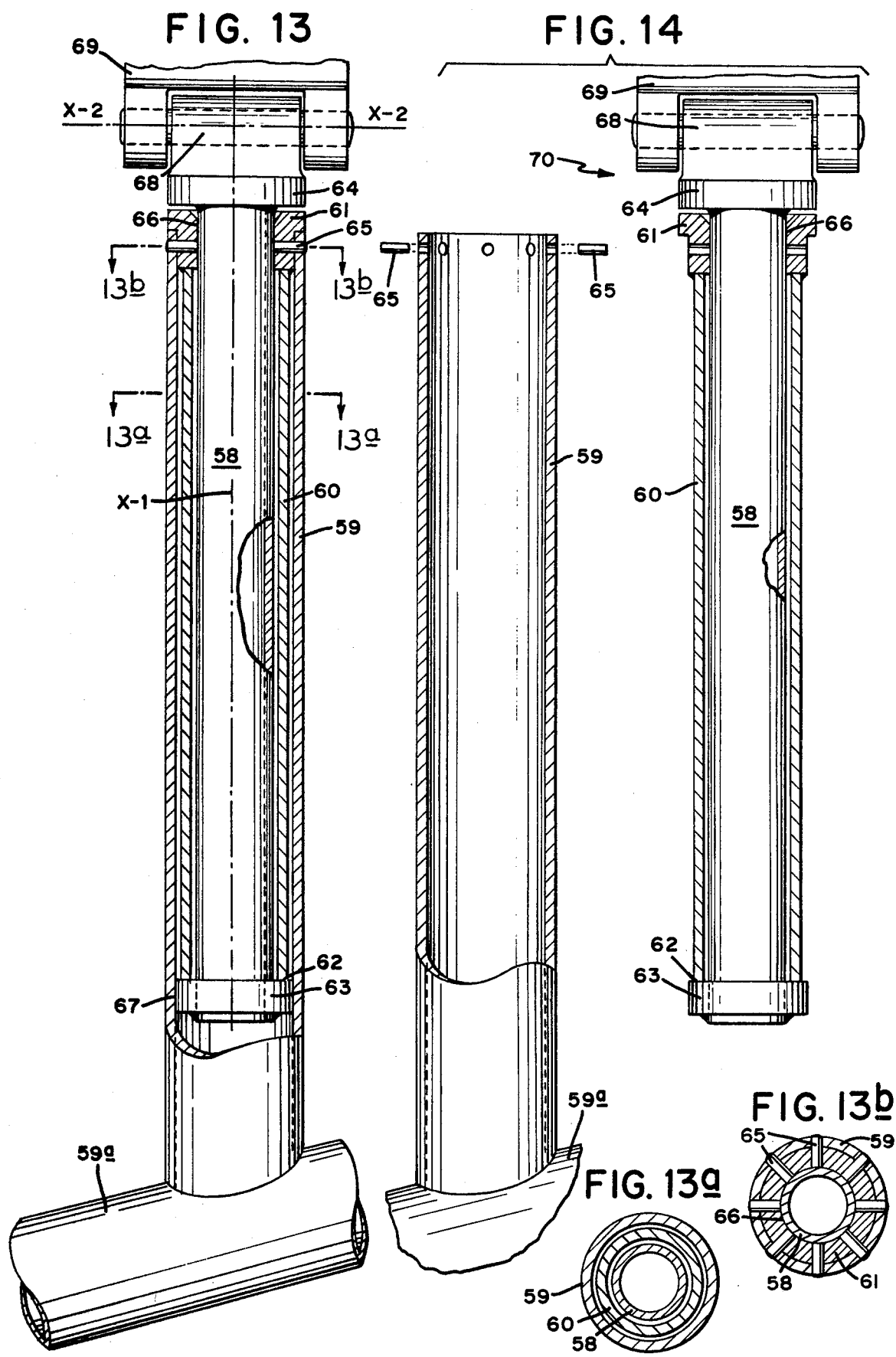

CONTINUOUS DRUM FILTER WITH IMPROVED AGITATOR STRUCTURE

BACKGROUND OF THE INVENTION

This invention relates to continuous rotary drum filters. In these filters, the filter drum operates in a vat receiving a supply of feed pulp or a feed suspension to be subjected to filtration in a manner well known in the art.

The invention by way of example is herein illustrated as embodied in the rotary vacuum drym type filter unit, and will herein be referred to and described accordingly. The end trunnions of the drum are supported in bearings associated with the end walls of the vat in fixed relationship therewith.

More in particular, this invention relates to improvements in the agitator mechanism employed in these filter units for the purpose of preventing sedimentation and accumulation of pulp solids on the bottom of the vat, the bottom usually having a curvature substantially conforming to the peripheral curvature of the filter drum. Small oscillating movements are imparted to the agitator about an horizontal axis parallel to the drum axis, so as to keep the pulp solids in suspension in the vat.

A conventional agitator mechanism comprises an agitator frame structure interposed between the bottom portion of the drum and the bottom of the vat. This agitator frame structure is shaped so as to conform substantially to the curvature of the drum, extending from end to end of the drum.

The ends of the agitator frame structure are supported for said oscillating movement about an horizontal axis extending parallel to the drum axis, and spaced vertically below the drum axis a distance such that the support bearing means for the agitator frame structure can be accommodated below the trunnions of the filter drum. Drive means operatively connected or linked to both ends of the agitator frame structure, are provided for imparting those small oscillating movements symmetrically to said frame structure.

In a preferred embodiment, illustrating the invention, the suspension of the agitator structure is implemented by a pair of frictionless so-called "torsion bearings" defining the horizontal axis of oscillation, and containing a rubber filler which absorbs the oscillation by internal torsional deformation of the rubber, and also cushions the reversal of movement of the oscillations. However, this does not exclude the use of other types of bearings in connection with this invention, for example sleeve bearings which may have a self lubricating bearing liner or the like. These alternatives are herein covered by the generic term "oscillatory bearing".

In the torsion bearing a rubber filter in the form of a thick walled rubber sleeve or thick walled annular rubber member tightly surrounds a center pin, secured thereto as by bonding, against rotational slippage of the rubber relative to the pin. The rubber bearing sleeve in turn is surrounded and tightly confined by a housing which comprises a bearing base portion and a bearing cap, both parts being bolted together in a manner whereby the rubber sleeve or filler is compressed sufficient to preclude rotational slippage between the rubber and the housing. The wall thickness radially of the rubber sleeve is such that a torque force applied to the housing by the oscillations, will be absorbed by torsional deformation or torsional "give" of the rubber, relative to the fixed center pin.

In the present context of the earlier construction of the agitator mechanism, the base portion or underside of the torsion bearing heretofore has been rigidly bolted to respective end suspension members or end plates extending rigidly from the agitator frame structure. Consequently, when the oscillating movement is imparted to the thus suspended agitator frame, that movement, through the housing of the torsion bearing, is absorbed by a corresponding degree of internal torsional of angular deformation of the rubber sleeve material, alternatingly in both directions.

When undue wear of the rubber sleeve material heretofore manifested itself, the bolts of the rigid suspension connection had to be removed to detach the agitator frame structure, when replacement of the torsion bearing was required.

A problem heretofore encountered in the operation and maintenance of the earlier agitator mechanism, was found in the appearance of premature wear and tear of the torsion rubber sleeve, manifesting itself in bumpy operation of the mechanism.

The problem, according to this invention, is attributable to non-torsional uneven transverse bearing stresses exerted upon the rubber sleeve, tending to squeeze the rubber material laterally out from the confinement in the bearing housing, and necessitating shutdown of the machine, and replacement of the torsion bearing or else of the center pin with rubber sleeve.

It was visualized that such deterioration of the rubber filler would develop, for instance, when uneven concentrated transverse bearing pressure is exerted upon the one or the other end of the rubber sleeve, as may be caused due to inaccuracies in alignment or construction of the agitator mechanism, or due to elastic deformation of the agitator frame, especially when considering the great length of the agitator structure, which may be between 20 feet and 30 feet.

Replacement of the torsion bearing would require shutdown of the machine, temporarily supporting the weight of the agitator structure so as to allow for disconnecting the agitator structure, and detaching the ends of the non-turnable bearing pin from its fixed supports. This releases the torsion bearing for replacement.

In view of the above stated problem, it is an object of this invention, to provide an improved agitator mechanism embodying means whereby the causes of the aforementioned undesirable stress effects upon the rubber filter of the torsion bearing are compensated for, and the number of shutdowns and bearing replacements are minimized or rendered largely avoidable.

SUMMARY OF THE INVENTION

To this end, the invention proposes to eliminate the aforementioned earlier rigid bolt connection between the agitator structure and the housing of the torsion bearing, and to substitute a non-rigid stress compensating suspension connection whereby objectionable or non-torsional pressure effects upon the rubber sleeve can be eliminated, irrespective of structural and alignment inaccuracies. That is to say, the substituted stress compensating device should eliminate objectionable stresses to the extent that the rubber sleeve will have to sustain substantially only the internal torsional stresses incident to the oscillations imparted to the agitator structure.

Accordingly, and more in particular, the invention provides a non-rigid stress compensating connection between the housing of each said torsion bearing and the respective end suspension members of the agitator frame structure. That connection is constructed and arranged so that it may be yieldable in the direction of the oscillatory axis, but not in the angular direction of the oscillations about said axis, thereby allowing the rubber in said torsion bearings to absorb the angular oscillatory movements imparted to the agitator frame structure about the oscillatory axis.

In one embodiment, the thus substituted stress compensating device comprises a single-hinge connection between the housing of the torsion bearing and the respective end of the agitator structure, arranged with the hinge axis to extend at right angles to the oscillatory axis of the agitator structure. A hinge pin connects a hinge member on the underside of the torsion bearing with a hinge member on the agitator structure. Thus, only the hinge pin need to be removed in case the torsion bearing is to be disconnected from the agitator structure.

In another embodiment, a double-hinge connection is employed instead of the single-hinge connection, providing stress compensation.

Therefore, the broad term "hinge connection" as herein employed is intended to embrace both the single-hinge and the double-hinge connection.

The invention further provides complementary stress relieving means associated with the hinge connection, whereby indeterminate complex or non-torsional stresses against the rubber bearing element in the torsion bearing are compensated for.

For that purpose, the hinge connection or device is connected to the agitator structure in a manner to allow for rotational self adjustment of the hinge device about a substantially vertical axis that is perpendicular to the axis of oscillation, yet having weight supporting connection with the agitator structure.

The invention also proposes that bouyancy imparting structural members be incorporated in the submerged part of the agitator structure, in order to provide relief from transverse load stresses upon the support bearings due to the weight of this agitator structure.

Specific features are found in the support mounting of the agitator structure, as well as in the construction of the agitator structure itself.

Other features and advantages will hereinafter appear.

DESCRIPTION OF THE DRAWINGS

FIG. 1 is a side view of a rotary vacuum drum type filter shown as an example embodying the invention, showing the form of the improved suspension of the oscillating agitator frame structure, featuring a single-hinge connection.

FIG. 8 is a detail top view of the torsion bearing taken on line 8—8 in FIG. 7.

FIG. 9 is a side view of the torsion bearing taken on line 9—9 of FIG. 7.

FIG. 10 is a vertical sectional view of the torsion bearing, taken on line 10—10 in FIG. 7, showing the rubber torsion material confined and compressed between the central bearing pin and the bearing housing.

FIG. 10a is an exploded view of the torsion bearing of FIG. 10, illustrating the procedure of replacing the central bearing pin having the surrounding rubber bonded thereto.

FIG. 10b is an enlarged perspective detail view of the bearing pin, taken from FIG. 10 of the torsion bearing.

FIG. 11 is a cross sectional detail view of the support structure for the torsion bearing, taken on line 11—11 in FIG. 7.

FIG. 12 is a perspective view of the improved agitator frame structure detached.

FIG. 13 is a vertical sectional view of another form of the improved suspension of the agitator structure.

FIG. 13a is a cross-sectional view taken on lines 13a — 13a in FIG. 13.

FIG. 13b is a cross-sectional view taken on line 13b — 13b in FIG. 13.

FIG. 14 shows the compount support connection of FIG. 13, with parts disassembled.

FIG. 16 shows another type of support bearing for the agitator structure.

FIG. 17 shows a double-hinge suspension for the agitator structure.

FIG. 18 is a vertical end view taken on line 18—18 in FIG. 17.

DETAILED DESCRIPTION

Figure 2:
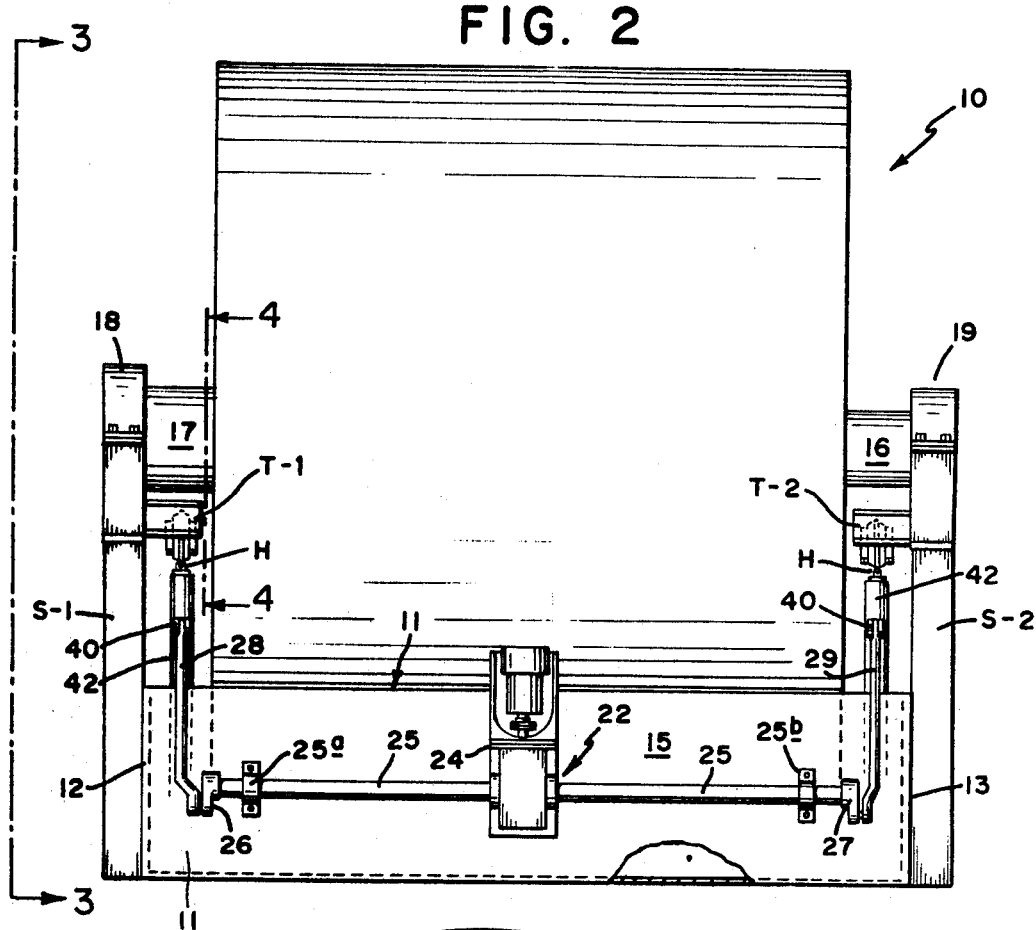
FIG. 2 is a side view of the filter, similar to FIG. 1, although enlarged and schematically simplified, for better showing of the improved suspension and construction of the agitator structure.

A rotary vacuum drum filter unit of generally known construction is shown in side view in FIG. 1, as an example embodying the invention. More specifically, the invention is directed to improvements in the agitator mechanism provided in these filters for the purpose of maintaining the feed pulp solids in suspension underneath the submerged bottom portion of the filter drum in the filter vat, as further illustrated in the enlarged views of the machine in FIGS. 2 and 3.

Such a filter unit mainly comprises a horizontal filter drum 10 mounted for rotation in a filter vat 11 defined by end walls 12 and 13, side walls 14 and 15, and a curved bottom 15a. The filter drum has trunnions 16 and 17 supported in a pair of main bearings 19 and 18 respectively mounted upon respective support structures S-2 and S-1 at the end walls 13 and 12 of the vat. A feed supply conduit (not shown) delivers feed suspension or feed pulp to the vat, to be subjected to filtration by vacuum applied to the interior of the filter drum in a manner through a trunnion valve well known in the art.

Figure 3:
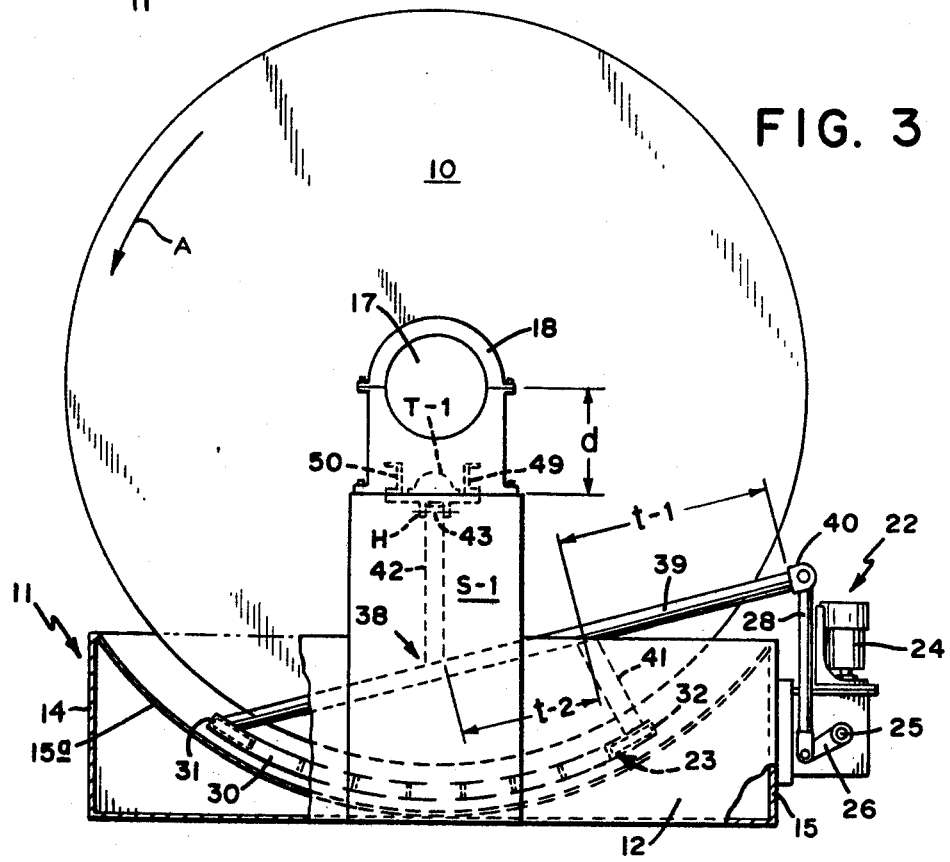
FIG. 3 is an end view of the filter, taken on line 3—3 of FIG. 2, further showing the improved suspension and construction of the agitator structure.

Considering FIG. 1 along with FIGS. 2 and 3, the one trunnion 16 is operatively connected to a drive mechanism 20 for rotating the filter drum. The opposite trunnion 17 cooperates with a well known trunnion valve 21 providing the vacuum supply to the interior of the filter drum. As the filter drum is rotated in the direction of arrow "A" with the bottom portion thereof submerged in the bath or body of feed pulp in the vat, the vacuum causes the formation of filter cake upon the exterior of filter drum, while filtrate liquid is being withdrawn by the vacuum through the trunnion valve. Thus freshly formed filter cake continuously emerges from the bath on the ascending side of the drum, being held thereto by the vacuum until it is removed at the descending side as by means of scraper or other cake removal devices (not shown).

As shown in FIGS. 1, 2 and 3, an actuating mechanism 22 imparts oscillating movements symmetrically to both ends of an agitator structure 23 functionally interposed between the submerged bottom portion of the filter drum and the bottom 15a of the vat. The agitator structure 23 is suspended so that oscillation may be imparted thereto by the actuating mechanism about an horizontal axis located vertically below the axis of the filter drum, as indicated by the vertical distance "d" (see FIG. 3).

The actuating mechanism 22 comprises a drive unit 24 mounted centrally upon the side wall 15 of the vat. An horizontal shaft 25 extends from the drive unit in both directions substantially the length of the filter drum guided in bearings 25a and 25b, a pair of parallel identical crank arms 26 and 27 provided upon respective ends of the shaft, have vertical connecting rods or linkages 28 and 29 respectively, connecting the crank arms with respective ends of the agitator structure, so that rotation of the horizontal shaft 25 by the drive unit will impart the oscillating movements to the agitator structure.

FIG. 2 is an enlarged simplified version of the drum filter unit shown in FIG. 1. This version taken in conjunction with the end view thereof in FIG. 3, presents the general arrangement of one form of the present improved agitator mechanism with similar parts designated by numerals the same as corresponding parts in FIG. 1.

The agitator structure 23 comprises a curved frame structure 30 best shown in conjunction with the perspective view of FIG. 12. As seen in FIG. 3, the curved frame structure 30 is interposed between the submerged bottom portion of the filter drum and the corresponding curved bottom 15a of the vat.

In the preferred embodiment shown, the agitator frame structure 30 resembles a curved grating of oblong rectangular configuration, extending from end to end of the filter drum. The agitator structure 23 is suspended for oscillation about an horizontal axis spaced vertically downward from the trunnion axis as indicated by the distance "d".

Oscillating movements imparted to the agitator structure in FIG. 3 and FIG. 2 will agitate the feed pulp contained in the space between the submerged portion of the filter drum and the curved bottom of the vat, thus keeping the feed solids in suspension suitable for the formation of the filter cake upon the drum.

In the preferred embodiment (see FIG. 3 and FIG. 12) the agitator frame structure 30 comprises a pair of hollow longitudinal parallel side edge members 31 and 32 constructed and arranged so as to impart buoyancy to the frame structure when submerged in the bath of feed suspension or feed pulp contained in the vat. The buoyancy is aided by the relatively high specific gravity of the pulp.

The buoyancy imparting side edge members 31 and 32 are shown to be in the form of channels of closed rectangular cross-sectional profile which may be of a standard manufacture, possessing inherently great rigidity. The member 31 has closed ends 31a and 31b, the member 32 has closed ends 32a and 32b. The buoyancy of the hollow side members 31 and 32 is provided for the purpose of reducing the transverse load effect of the weight of the agitator structure upon a pair of torsion bearings "T-1" and "T-2" whereby the respective ends of the agitator structure are suspended for oscillation, all as will be furthermore set forth below.

A curved cross member 33 rigidly interconnects the side members 31 and 32 at one end thereof, a cross member 34 rigidly interconnects the opposite ends. The members 31, 32, 33 and 34 thus constitute a basic rectangular frame of great rigidity, definable by the straight length "L-1" of the side members and by the curved length of "L-2" of the cross members.

Within this basic rectangular frame there are provided longitudinal agitator blades 36 in the form of flat strip material extending parallel to the longitudinal side members, and endwise fixed, as by welding, to the respective cross members 33 and 34. The flat faces of these agitator blades 36 extend transversely of the angular direction of the oscillations, to provide a desired solids agitation and dispersal uninhibited by the free and unencumbered top edges of the agitator blades.

The longitudinally extending agitator blades or flat strips 36 may be equally spaced from one another as indicated by the distance "d-1". These agitator blades in turn are braced against one another as by the provision of flat strip cross braces 37. These cross braces also having free top edges, in turn are endwise fixed or welded to the associated longitudinal agitator blades 36. Shown are several parallel rows of such cross braces, spaced from one another as indicated by the distance "d-2". These cross braces 37 may extend in respective parallel vertical planes in direction that coincides with the direction of the oscillating movements of the agitator structure.

Connected rigidly to each end of the agitator frame structure 30 is an end suspension structure 38 whereby the agitator structure is suspended from the respective torsion bearings "T-1" and "T-2". In this preferred embodiment, the end suspension structures 38 are in the form of rigidly interconnected weight saving tubular or pipe sections (see FIG. 12). According to one embodiment, these end suspension structures are connected to the respective supporting torsion bearings through a single-hinge device "H". As compared with the conventional bolted flange connection, this will reduce undesirable and uneven transverse stresses upon the torsion rubber element of the support bearings. Yet, replacement of the bearing is facilitated simply by removal of the hinge pin from the connection.

Accordingly, the end suspension structure 38 comprises a first or relatively long tubular element 39 extending from the end of one longitudinal side member 31 at an upward slope across and above the opposite side member 32, and further a short distance beyond the respective side wall 15 of the vat (see FIG. 3). The outer upper ends of tubular elements 39 are formed with a terminal 40 shaped for pivotal connection with the aforementioned vertical connecting rods 28 and 29 of the actuating mechanism shown in FIGS. 1, 2 and 3.

A second or short tubular brace element 41 rigidly connects said opposite side member 32 with an intermediate portion of the long tubular element 39, at a distance "t-1" from the terminal 40.

A third or upstanding tubular element 42 extends upwardly from the long tubular element 39 at a point spaced a distance "t-2" from the short brace element 41. The upstanding tubular elements 42 are formed with a terminal 43 representing the lower hinge member in the hinge connection "H" between the tubular element 42 and the associated torsion bearing furthermore described below. Both torsion bearings "T-1" and "T-2" represent the axis of oscillation for the agitator structure.

Figure 5:
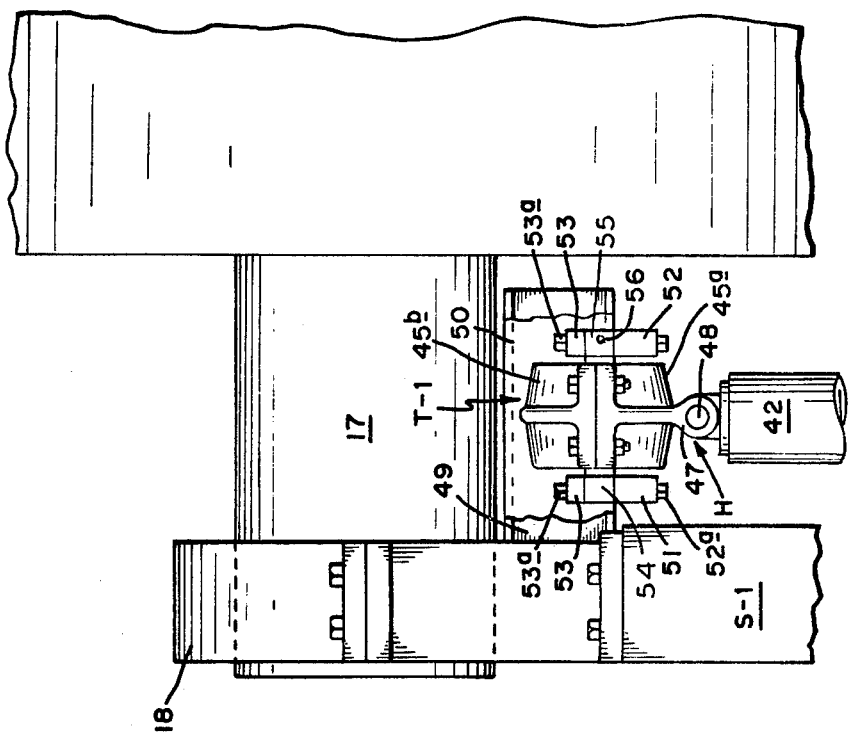
FIG. 5 is a side view of the suspension mounting of the agitator structure, taken on line 5—5 in FIG. 4.
Figure 4A:
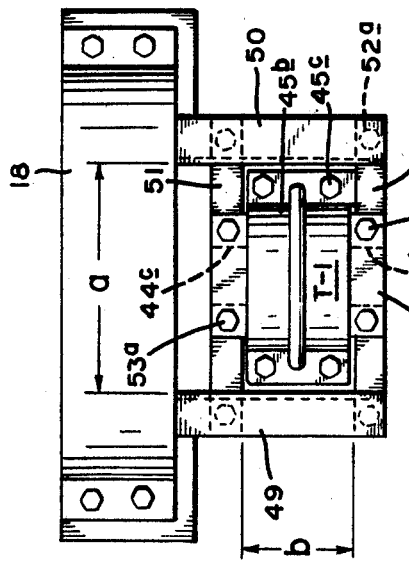
FIG. 4a is a plan view of the structure of FIG. 4 taken on the line 4a — 4a of FIG. 4.
Figure 4:
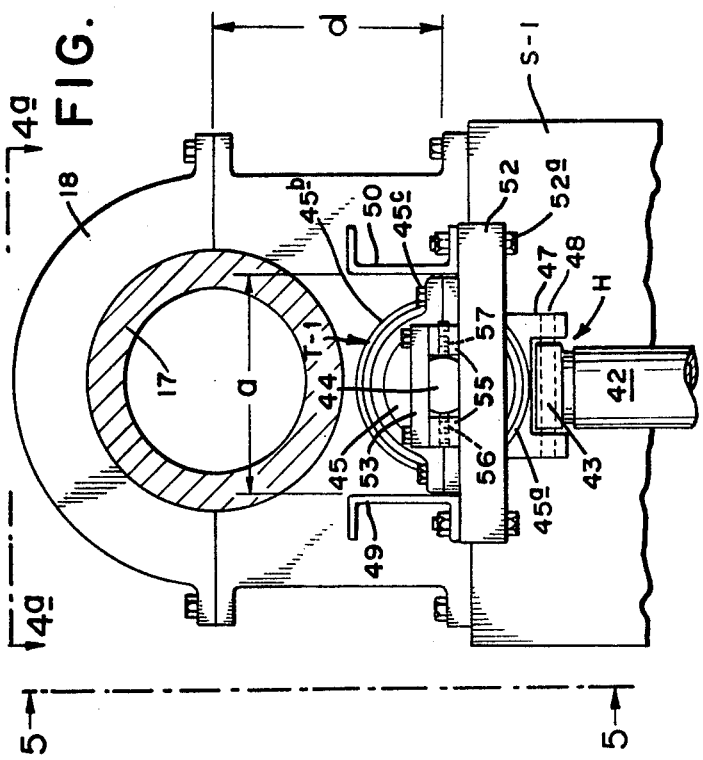
FIG. 4 is a further enlarged detail end view, taken on line 4—4 in FIG. 3, showing details of the improved suspension and mounting of the agitator structure.

Referring to FIGS. 4 and 5, there now follows in detail the description of the improved suspension of the agitator structure from the torsion bearings "T-1" and "T-2" and of novel mounting and supporting means therefor.

As part of a combination (see also detail FIGS. 8, 9, 10, 10a and 10b) each torsion bearing comprises a center pin 44 consisting of a cylindrical body portion 44a and flattened end portions 44b and 44c as defined by the thickness "k". The body portion is surrounded tightly by an annular body or torsion element 45 consisting of rubber or similar resiliently deformable material. This rubber element is secured against rotational slippage on the center pin as by a bonding agent 46.

The rubber torsion element 45 in turn is surrounded tightly by a housing that comprises a base member 45a and a cover member 45b, both clamped together as by bolt connections 45c. The clamping tightness against the enclosed torsion rubber element is such as to prevent rotational slippage between the housing and the rubber element, when a torque force is applied to the housing relative to the fixed center pin, by the oscillations imparted to the agitator structure, inducing corresponding resilient torsional deformation of the rubber element.

For the purposes of this invention, the housing base member 45a is formed with a downward extension shaped to constitute an upper hinge member 47 cooperating with the lower hinge member 43 provided on the agitator structure. When interconnected by a hinge pin 48, these hinge members constitute the hinge device or hinge connection "H".

The torsion bearings thus qualified are mounted each on a cradle like support structure extending rigidly inwardly from the base portion of the respective main bearings 18 and 19, and thus horizontally into the spaces below the respective trunnions 17 and 16.

Accordingly, and referring to FIGS. 4 and 5, the torsion bearing "T-1" is supported between a pair of horizontal parallel arms shown to be in the form of structural channel members 49 and 50 extending rigidly from the main bearing 18 inwardly and parallel to the trunnion axis and spaced from one another as by a distance "a" (see also FIG. 11).

A pair of transverse parallel support members 51 and 52 are fastened by means of bolts 52a to the underside of the channel members, are spaced from one another as by a distance "b". The arms 49 and 50 together with the transverse members 51 and 52 thus form a rectangular open area defined by the dimensions "a" and "b", occupied by the torsion bearing "T-1".

Figure 6:
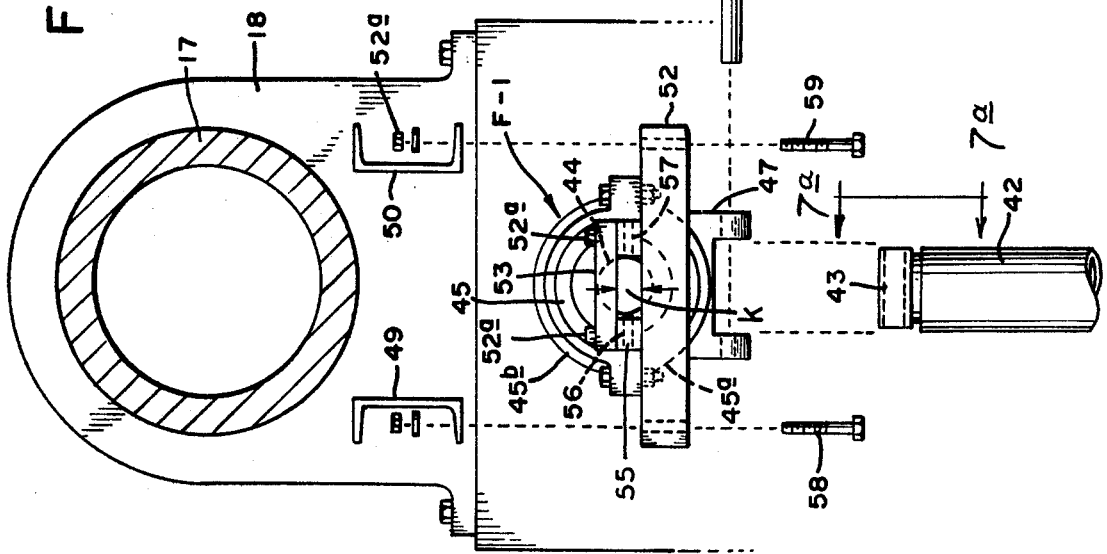
FIG. 6 is an exploded view of the parts of the suspension mounting of the agitator structure, corresponding to the view of FIG. 4, illustrating the procedure of installation of the parts.

Referring to FIG. 4, and FIG. 4a and also to the exploded view of FIG. 6, it is seen that the torsion bearing "T-1" is supported endwise directly upon the transverse members 51 and 52 in that the flattened end portions 44b and 44c of center pin 44 are clamped down upon the respective members 51 and 52.

Clamping means for that purpose comprise an horizontal transverse clamping bar 53 bolted endwise to a pair of spacer blocks 54 and 55 fixed to the respective transverse support members 51 and 52 (see also FIG. 11). The height of the spacer blocks is such as to accommodate the thickness "k" of the flattened end portions of the aforementioned center pin 44, fixedly securing the center pin against rotation. Securing bolts 53a for the clamping bars 53 are threaded into respective spacer blocks.

Horizontal set screws 56 and 57 are provided in the spacer blocks, operable for effecting lateral adjustment of the center pin, when needed, to establish axial alignment. Adjustability of the torsion bearing vertically can be effected by the interposition of shims between the arms of channel members 49 and 50 and the transverse support members 51 and 52.

The exploded view of FIG. 6 illustrates a procedure of assembling the torsion bearing upon its support structure, whereby the torsion bearing is first assembled upon the two transverse support members 51 and 52. This sub-assembly then is raised into position against the underside of the arms or channel members 49 and 50.

The position can then be fixed by respective exploded bolt connections indicated at 58 and 59. With the assembly thus completed as seen in FIG. 4, the agitator structure 23 may then be raised into position in order to complete the aforementioned hinge connection "H" between the agitator structure and the torsion bearing, by inserting the hinge pin 48.

Figure 7:
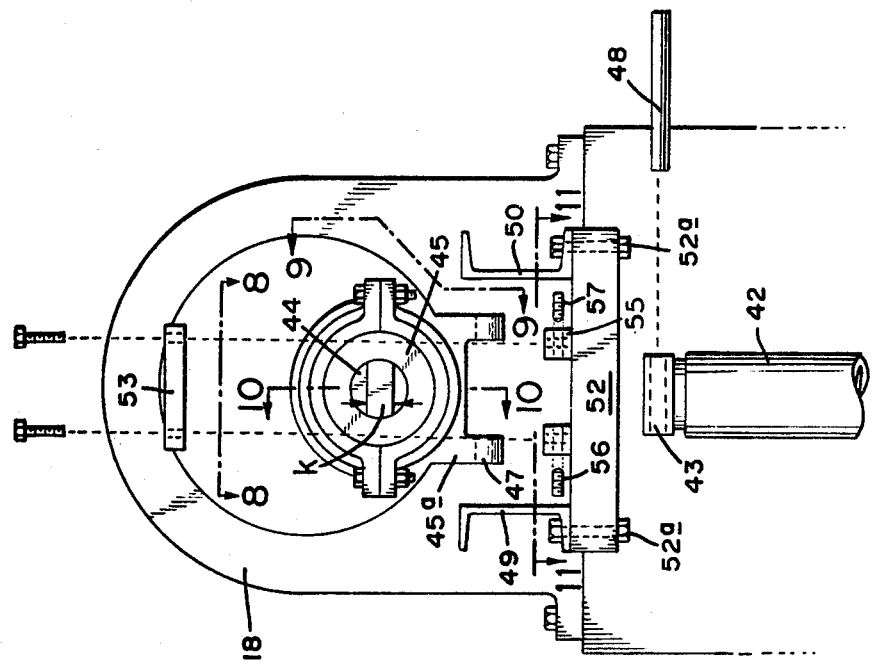
FIG. 7 is a different exploded view of the parts of the suspension mounting of the agitator structure, corresponding to the view of FIG. 4, illustrating the procedure of detaching and removing the torsion bearing.
Figure 7A:
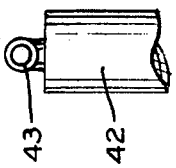
FIG. 7a is a detail view taken on line 7a — 7a in FIG. 7.

The exploded view in FIG. 7 differs from that of FIG. 6, in that it illustrates a procedure that may be followed in case the torsion bearing as a unit is to be replaced. From this view it is seen that the torsion bearing may be separated from the agitator structure simply by removing the hinge pin 48, and then unbolting the clamping bars 53, thereby releasing the flattened ends of center pin 44 from their respective clamping devices.

As illustrated in FIGS. 13, 13a, 13b, 14 and 15, the hinge connection "H" may be complemented in a manner to constitute with the hinge device a compound stress relieving connection between the torsion bearing and the agitator structure, whereby indeterminate or non-torsional stresses against the rubber torsion bearing element 45 may be compensated for over a wider range.

Such a compound stress relief connection or device in the embodiment of FIG. 13, may be built into the agitator structure 23 shown in FIGS. 3 and 12, and more specifically into the upstanding tubular suspension element 42 of the agitator structure.

The compound stress relieving device in that embodiment (see FIG. 13) comprise a stem or relatively long rod or tubular member 58 concentrically surrounded by an outer tubular section 59 which corresponds to the upright tubular section 42 of the agitator structure in FIG. 3 and FIG. 12. The upright tubular section 59 extends rigidly from a sloping tubular section 59a which corresponds to tubular section 39 in FIGS. 3 and 12.

An annular space between stem 58 and the surrounding tubular section 59 is occupied by a spacer tube 60 the upper end of which is fixed as by welding to an annular top closure member 61 fitted into the top end of the outer tubular section 59. The spacer tube 60 extends downward along the length of stem 58 as far as an annular shoulder 62 formed by annular lower terminal collar or abutment member 63 fixed to the lower end of stem 58, and dimensioned for sliding fit within the outer tubular member 59. The upper end of rod 58 in turn has sliding fit in the annular top closure member 61, and has an upper terminal abutment 64 engaging the top face of the annular closure member 61.

A number of peripherally spaced and radially directed horizontal securing pins 65 are provided and arranged in a manner whereby the annular closure member 61 is locked firmly to the outer tubular section 59.

Thus, it is seen that the stem 58 is turnable about its longitudinal axis X-1, guided within the outer tubular section 59 at the upper end and the lower end, as indicated by numerals 66 and 67 respectively. The longitudinal axis X-1 is perpendicular to the axis X-2, X-2 of a hinge device 68 which connects the top end of the rod 58 with a torsion bearing 69 substantially in the manner previously described. Support structure to the torsion bearing may be the same as previously described in connection with FIGS. 4 and 5.

With the locking pins 65 in place, the rod 58 is turnable about the longitudinal axis X-1 but is confined in axial direction, thereby supporting the weight of the agitator structure.

In transmitting the weight of the agitator structure to the respective torsion bearings, the outer tubular member 59 of the agitator structure is subject to tension, while the spacer tube 60 is subject to compression. Thus, the weight is transmitted by tension up through the outer tubular member 59, and then through the locking pins 65 and the annular top closure member 61 to the spacer tube 60 which is subject to compression. The spacer tube 60 in turn through bottom stop member or collar 63 places the stem 58 under a tension force which is the weight acting on the outer tubular member 59 of the agitator structure. From the upper end of the stem 58 this force or weight portion of the agitator structure is transmitted through the hinge device 68, to the torsion bearing 69.

In assembling the compound stress relieving device of FIG. 13, a sub-assembly 70 is first prepared (see FIG. 14), comprising the parts 58, 60, 61, 63 and 64 of the device. This sub-assembly is then inserted into the tubular section 59, and locked in place therein by the insertion of the locking pines 65 as shown.

Figure 15:
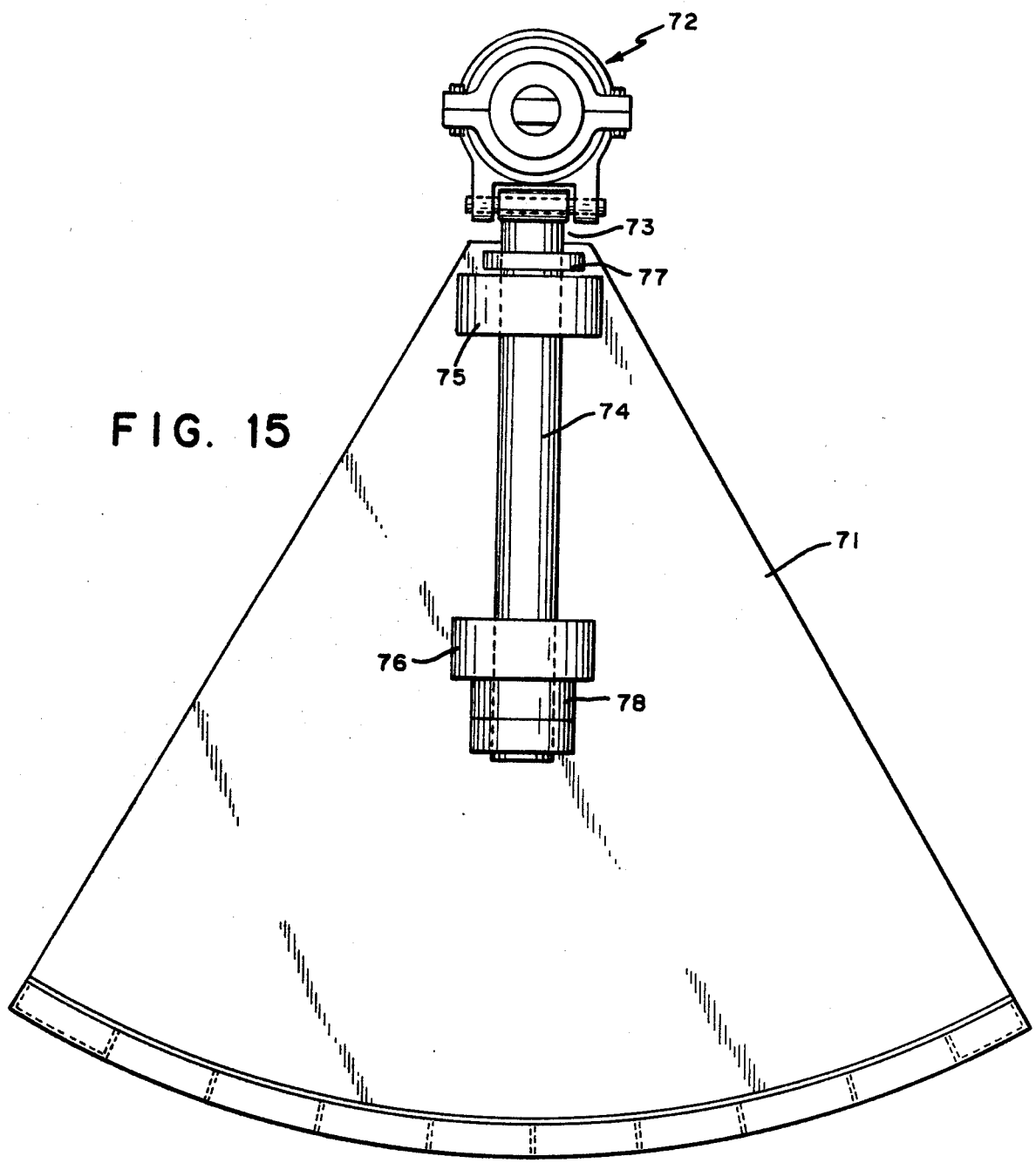
FIG. 15 shows another form of the improved suspension of the agitator structure.

FIG. 15 illustrates an adaptation of a compound stress relieving device on the order of that in FIG. 13, to an older or conventional agitator structure wherein the end suspension members are in the form of an end plate member 71 shown to be of general triangular configuration. In that adaptation, a torsion rubber bearing 72 of the kind previously described has a hinge connection 73 with a depending stem 74 of circular cross-sectional profile. The longitudinal axis of this stem is perpendicular to the hinge axis of the hinge device.

The rod 74 itself is guided in a pair of vertically spaced bearings 75 and 76 fixed to the end plate member 71. This rod while turnable in the two bearings, is secured against axial displacement in both directions as by the provision of stop members 77 and 78 fixed on the rod, and engaging respective bearings 75 and 76 as shown.

Whereas the hinge device and the complementary device shown in FIGS. 13, 14 and 15, may be employed individually, it will be understood that the combination thereof in a compound stress relieving connection or device, may compensate for a wide range of deviations. The hinge pin being removable facilitates the disconnecting as well as reconnecting of the agitator structure.

It will also be seen that there is a conjoint stress relieving effect upon the rubber torsion element in the torsion bearings, due to the coaction of the stress compensating suspension devices and the weight saving construction of the agitator structure.

A support bearing 79 for the agitator structure, as shown in FIG. 16, differs from the rubber torsion bearing shown in the other drawing figures, in that it is representative of the sleeve bearing type. Accordingly, in this embodiment the bearing is shown to comprise an axle or pin 80 which of itself may be similar to the one in the torsion bearing. This axle operates in a sleeve or liner 81 which may be of the plastic or self lubricating type, being fitted into a bearing block 82. The bearing block is externally similar to the bearing housing of the torsion bearing, being formed with a hinge member 83 as part of the hinge connection previously described.

FIGS. 17 and 18 show a double-hinge connection 84 for the suspension of the agitator structure, instead of the singlehinge connection shown in the other drawing figures, and providing an additional stress compensating factor.

Accordingly, in this embodiment, the double-hinge connection 84 comprises a link member 85. The lower end portion of the link member is hinged to the top end portion 86 of the agitator structure which latter may be similar to the one shown in FIG. 12, by means of lower hinge pin 87. The upper end portion of the link member is hinged to the underside of support bearing 88 shown to be similar to the torsion bearing previously described, by means of upper hinge pin 89.

Thus, it will be understood that the double-hinge connection of FIG. 17 and 18 may be advantageously combined with, or be complemented by the compensating device of FIG. 13 or FIG. 15, towards attaining optimum stress relief for the supporting bearings. Accordingly, the top end portion 86 of the agitator structure, shown in FIGS. 17 and 18, would comprise the compensating device of FIG. 13.

What is claimed is:

1. In a continuous rotary drum filter unit comprising a rotary filter drum having a pair of end trunnions, a filter vat having feed means for supplying feed suspension to the vat, to be subjected to filtration by said drum, a pair of main bearings for the respective trunnions, associated with respective ends of the vat in fixed relationship therewith, whereby the filter drum is rotatably supported with the lower portion thereof immersed in the bath of feed suspension in the vat, the provision of an agitator mechanism for maintaining feed solids in suspension in the vat, which mechanism comprises an agitator frame structure having a curved frame shaped so as to conform substantially to the circular curvature of the filter drum at the underside thereof, and in radially spaced relationship therewith, said agitator frame structure extending within the vat substantially from end to end of the filter drum, a pair of rubber torsion bearings disposed below the respective trunnsions and aligned so as to define an oscillatory axis for said agitator frame structure, extending parallel to, and spaced vertically downwardly from the trunnions axis, support means for said torsion bearings, fixedly associated with the respective ends of the vat, said torsion bearings comprising a center vearing pin fixed relative to said support means, a rubber filler in the form of a thick walled annular member surrounding the center pin and secured thereon against rotational slippage, and a housing surrounding said annular rubber member sufficiently tight to prevent slippage between the rubber member and the housing when torque is applied to the housing relative to the fixed center pin, by oscillatory movements imparted to the agitator frame structure, an end suspension structure extending rigidly from each end of the curved frame towards the respective torsion bearing, and in a plane perpendicular to the oscillatory axis, a hinge connection between said bearing housing and the associated end suspension structure of the agitator frame structure, with a hinge axis extending at right angles to the trunnion axis, and actuating means for imparting said oscillating movements to the agitator frame structure.

2. The agitator mechanism according to claim 1, wherein said hinge connection is a single hinge connection comprising an upper hinge member extending downward from the underside of said bearing housing, a lower hinge member extending upward from the associated end suspension structure, and a hinge pin interconnecting said hinge members.

3. The agitator mechanism according to claim 1, wherein the support structure for at least one of said torsion bearings is connected to the adjacent main bearing, and arranged so as to extend rigidly therefrom horizontally inwardly underneath said main bearing.

4. The agitator mechanism according to claim 1, wherein the support means for at least one of said torsion bearings comprises a downwardly open cradle construction connected to the adjacent main bearing, and arranged so as to extend rigidly therefrom horizontally inwardly underneath the associated trunnion, and wherein said torsion bearing is mounted on said cradle construction so as to allow for connection of the underside of the housing with the associated suspension member of the agitator frame structure.

5. The agitator mechanism according to claim 1, wherein the support means for at least one of said torsion bearings comprises a pair of parallel support arms spaced horizontally from each other, and straddling the oscillatory axis in parallel relationship therewith, said support arms extending rigidly from the associated bearing, underneath the associated trunnion, a pair of secondary parallel support members spaced horizontally from each other, and detachably fixed to the underside of said support arms, and in transverse rectangular relationship therewith, such as to define with said support arms a rectangular opening, and a pair of clamping devices for detachably fixing the respective ends of the bearing center pin upon respective secondary support members, and in alignment with the oscillatory axis, whereby said torsion bearing is lodged in said rectangular opening.

6. The agitator mechanism according to claim 1, wherein said hinge connection is a double hinge connection comprising a upper hinge member extending downward from the underside of said bearing housing, a lower hinge member extending upward from said associated end suspension member, and a link member between said upper and said lower hinge member having an upper end portion hingedly connected to said upper hinge member, and having a lower end portion hingedly connected to said lower hinge member.

7. The agitator mechanism according to claim 1, wherein the agitator frame structure is constructed and arranged to impart buoyancy to the agitator structure in the bath of feed suspension in the vat.

8. The agitator mechanism according to claim 1, wherein said curved frame comprises a pair of side edge members parallel to the oscillatory axis, wherein said end suspension structure of the agitator frame structure comprises a first linear relatively long actuator member extending from the end of one side edge of the agitator frame structure at an upward slope across the opposite side edge member to a point above and beyond the respective side wall of the vat, a second relatively short linear brace member rigidly connecting the end of the opposite side edge member with an intermediate portion of said first long actuator member, and a third linear connector member extending rigidly from said first long actuator member in an upward direction towards the associated torsion bearing, a hinge connection between said third linear member and the associated bearing housing, and wherein pivotal means are provided for operatively connecting the upper outer end of said first linear member with the actuating mechanism.

9. The agitator mechanism according to claim 1, wherein said end suspension structure of the agitator frame structure comprises a first tubular relatively long actuator member extending from the end of one side edge of the agitator frame structure at an upward slope across the opposite side edge member to a point above and beyond the respective side wall of the vat, a second relatively short tubular brace member rigidly connecting the end of said opposite side edge member with an intermediate portion of said first long actuator member, and a third tubular connector member extending rigidly from said first long actuator member in an upward direction coinciding with the central radius of the curvature of the agitator frame structure towards the associated torsion bearing, the upper end of said third linear member constituting the lower hinge member, and wherein pivotal means are provided for operatively connecting the upper outer end of said first linear member with the actuating mechanism.

10. The agitator mechanism according to claim 1, wherein the agitator frame structure comprises hollow side members parallel the axis of the oscillating movements, and constructed and arranged to impart buoyancy to the agitator structure.

11. In a continuous rotary drum filter unit comprising a rotary filter drum having a pair of end trunnions, a filter vat having feed means for supplying feed suspension to the vat, to be subjected to filtration by said drum, a pair of main bearings for the respective trunnions, associated with respective ends of the vat in fixed relationship therewith, whereby the filter drum is rotatably supported with the lower portion thereof immersed in the bath of feed suspension in the vat, the provision of an agitator mechanism for maintaining feed solids in suspension in the vat, which mechanism comprises an agitator frame structure shaped so as to conform substantially to the circular curvature of the filter drum at the underside thereof and in radially spaced relationship therewith, said agitator frame structure extending within the vat substantially from end to end of the filter drum, a pair of rubber torsion bearings disposed below the respective trunnions and aligned so as to define an oscillatory axis for said agitator frame structure, extending parallel to, and spaced vertically downwardly from the trunnion axis, support means for said torsion bearings, fixedly associated with the respective ends of the vat, an end suspension structure extending from each end of the curved frame upwardly towards the respective support bearing, a hinge connection between said bearing and the associated end suspension structure of the agitator frame structure, with an hinge axis extending at right angles to the trunnion axis, a depending stem extending downwardly from said hinge connection, at right angles to the oscillatory axis, mounting means connecting said stem with the associated end suspension structure of the agitator frame, constructed and arranged so that said stem is capable of rotational self adjustment about the longitudinal axis of the stem relative to said suspension structure, but is confined against axial displacement relative to said suspension structure, while thus supporting the weight of the agitator frame, and actuating means for imparting said oscillating movements to the agitator frame structure.

12. The agitator mechanism according to claim 11, wherein said end suspension structure of the agitator frame structure comprises an upstanding tubular member concentrically surrounding said depending stem, an annular top closure member fitted into the top end of said tubular member, a spacer tube surrounding said stem, and in turn surrounded by said tubular member, said spacer tube being fixed to said closure member, an upper abutment collar formed upon the upper end portion of said stem, a lower abutment collar formed upon the lower end of the stem, and so spaced from the upper abutment collar that said spacer tube is confined between said upper and lower abutment collars against axial displacement relative to said upstanding tubular member, said lower collar and said top closure member being constructed and arranged so as to provide guidance for the lower and the upper end respectively of the stem relative to said upstanding tubular member.

13. The agitator mechanism according to claim 11, wherein a pair of vertically spaced guide bearings are provided upon said end suspension structure for accommodating said stem in a manner to allow for rotational self adjustment of the stem in said bearings about the longitudinal axis of the stem, and wherein means are provided for securing the stem against axial displacement relative to said bearings.

14. In a continuous rotary drum filter unit comprising a rotary filter drum having a pair of end trunnions, a filter vat having feed means for supplying feed suspension to the vat, to be subjected to filtration by said drum, a pair of main bearings for the respective trunnions, associated with respective ends of the vat in fixed relationship therewith, whereby the filter drum is rotatably supported with the lower portion thereof immersed in the bath of feed suspension in the vat, the provision of an agitator mechanism for maintaining feed solids in suspension in the vat, which mechanism comprises an agitator frame structure having a curved frame shaped so as to conform substantially to the circular curvature of the filter drum at the underside thereof, and in radially spaced relationship therewith, said agitator frame structure extending within the vat substantially from end to end of the filter drum, a pair of oscillatory support bearings disposed below the respective trunnions and aligned so as to define an oscillatory axis for said agitator frame structure, extending parallel to, and spaced vertically downwardly from the trunnion axis, support means for said bearings, fixedly associated with respective ends of the vat, an end suspension structure extending from each end of the curved frame upwardly and connected to the respective support bearing, and a depending stem operatively connected to the respective bearing so as to be non-rotatable relative to said bearing, mounting means connecting said stem with the associated end suspension structure of the agitator frame, constructed and arranged so that said stem is capable of rotational self adjustment about the longitudinal axis of the stem relative to said suspension structure, said stem being confined against axial displacement relative to said suspension structure, while thus supporting the weight of the agitator frame structure.

15. In a continuous rotary drum filter unit comprising a rotary filter drum having a pair of end trunnions, a filter vat having feed means for supplying feed suspension to the vat, to be subjected to filtration by said drum, a pair of main bearings for the respective trunnions, associated with respective ends of the vat in fixed relationship therewith, whereby the filter drum is rotatably supported with the lower portion thereof immersed in the bath of feed suspension in the vat, the provision of an agitator mechanism for maintaining feed solids in suspension in the vat, which mechanism comprises an agitator frame structure having a curved frame shaped so as to conform substantially to the circular curvature of the filter drum at the underside thereof, and in radially spaced relationship therewith, said agitator frame structure extending within the vat substantially from end to end of the filter drum, a pair of oscillatory support bearings disposed below the respective trunnions and aligned so as to define an oscillatory axis for said agitator frame structure, extending parallel to, and spaced vertically downwardly from the trunnion axis, support means for said support bearings, fixedly associated with respective ends of the vat, said support bearings comprising a bearing pin fixed relative to said support means, and an end suspension structure extending rigidly from each end of the curved frame upwardly and connected to the respective support bearing, said end suspension structure comprising a first linear relatively long actuator member extending from the end of one side edge of the agitator frame structure at an upward slope across the opposite side edge member to a point above and beyond the respective side wall of the vat, a second relatively short linear brace member rigidly connecting the end of said opposite side edge member with an intermediate portion of said first long actuator member, and a third linear connector member extending rigidly from said first long actuator member in an upward direction, a support connection between said third linear member to the associated support bearing, and wherein pivotal means are provided for operatively connecting the upper outer end of said first linear member with the actuating mechanism.

16. The agitator mechanism according to claim 15, wherein said end suspension structure of the agitator frame structure comprises a first tubular relatively long actuator member extending from the end of one side edge of the agitator frame structure at an upward slope across the opposite side edge member to a point above and beyond the respective side wall of the vat, a second relatively short tubular brace member rigidly connecting the end of said opposite side edge member with an intermediate portion of said first long actuator member, and a third tubular connector member extending rigidly from said first long actuator member in an upward direction coinciding with the central radius of the curvature of the agitator frame structure towards the associated torsion bearing, and wherein pivotal means are provided for operatively connecting the upper outer end of said first linear member with the actuating mechanism.

17. In a continuous rotary drum filter unit comprising a rotary filter drum having a pair of end trunnions, a filter vat having feed means for supplying feed suspension to the vat, to be subjected to filtration by said drum, a pair of main bearings for the respective trunnions, associated with respective ends of the vat in fixed relationship therewith, whereby the filter drum is rotatably supported with the lower portion thereof immersed in the bath of feed suspension in the vat, the provision of an agitator mechanism for maintaining feed solids in suspension in the vat, which mechanism comprises an agitator frame structure having a curved frame shaped so as to conform substantially to the circular curvature of the filter drum at the underside thereof, and in radially spaced relationship therewith, said agitator frame structure extending within the vat substantially from end to end of the filter drum, a pair of oscillatory support bearings for the agitator frame structure, disposed below the respective trunnions and aligned so as to define an oscillatory axis for said agitator frame structure, extending parallel to, and spaced vertically downwardly from the trunnion axis, support means for said support bearings, fixedly associated with the respective ends of the vat, an end suspension structure extending rigidly from each end of the curved frame towards the respective support bearing, and in a plane perpendicular to the oscillatory axis, a hinge connection between said bearing and the associated end suspension structure of the agitator frame structure, with an hinge axis extending at right angles to the trunnion axis, and actuating means for imparting said oscillating movements to the agitator frame structure.

18. The agitator mechanism according to claim 17, wherein said hinge connection is a single hinge connection comprising an uppe hinge member extending downward from the associated oscillatory bearing, a lower hinge member extending upward from the associated end suspension structure, of the agitator frame structure, and a hinge pin interconnecting said hinge members.

19. The agitator mechanism according to claim 17, wherein said hinge connection is a double hinge connection comprising an upper hinge member extending downward from the associated oscillatory bearing, a lower hinge member extending upward from the associated end suspension structure of agitator frame structure, and a link member between said upper and said lower hinge member having an upper end portion hingedly connected to said upper hinge member, and having a lower end portion hingedly connected to said lower hinge member.

20. In a continuous rotary drum filter unit comprising a rotary filter drum having a pair of end trunnions, a filter vat having feed means for supplying feed suspension to the vat, to be subjected to filtration by said drum, a pair of main bearings for the respective trunnions, associated with respective ends of the vat in fixed relationship therewith, whereby the filter drum is rotatably supported with the lower portion thereof immersed in the bath of feed suspension in the vat, the provision of an agitator mechanism for maintaining feed solids in suspension in the vat, which mechanism comprises an agitator frame structure having a curved frame shaped so as to conform substantially to the circular curvature of the filter drum at the underside thereof, and in radially spaced relationship therewith, said agitator frame structure extending within the vat substantially from end to end of the filter drum, a pair of oscillatory support bearings disposed below the respective trunnions and aligned so as to define an oscillatory axis for said agitator frame structure, extending parallel to, and spaced vertically downwardly from the trunnion axis, support means for said support bearings, fixedly associated with respective ends of the vat, an end suspension structure extending from each end of the curved frame upwardly and connected to the respective support bearing, said end suspension structure of the agitator frame structure comprising a first linear relatively long actuator member extending from the end of one side edge of the agitator frame structure at an upward slope across the opposite side edge member to a point above and beyond the respective side wall of the vat, a second relatively short linear brace member rigidly connecting the end of said opposite side edge member with an intermediate portion of said first long actuator member, a third linear connector member extending rigidly from said first long actuator member in an upward direction coinciding with the central radius of the curvature of the agitator frame structure towards the associated torsion bearing, and a support connection between said third linear member and the associated support bearing, and pivotal means operatively connecting the upper outer end of said first linear member with an actuating mechanism for imparting oscillatory movement to said agitator mechanism.

21. The agitator mechanism according to claim 20 wherein said first, second and third linear members are all of a tubular construction.

* * * * *